United States Patent Office 3,073,795
Patented Jan. 15, 1963

3,073,795
DENTAL LINER COMPRISING POLYMETHYL METHACRYLATE, TALC AND METHYL METHACRYLATE
Joseph E. Veverka, 1632 22nd St., Des Moines, Iowa
No Drawing. Filed Sept. 25, 1959, Ser. No. 842,200
3 Claims. (Cl. 260—41)

This invention relates generally to dental plates and more particularly to a composition for forming a lining for dental plates.

Dental plates when first made and properly fitted to the mouth of the wearer are usually quite satisfactory until, after a time, the gums shrink. The result of this natural change is a loosening and misfitting of the dentures.

One of the methods for overcoming this problem, in lieu of completely new dentures, is the use of a thin lining of material added to the denture base so as to make up for the shrinking gums. This material is usually in the form of a liquid or powder composed of somewhat the same material used in the denture base, such as methyl methacrylate resins, for example.

Among the many problems created by these types of "liners," as they are commonly called, is one of permanence, the liquid and powder forms requiring frequent renewal, and another of sufficient adhesive nature so as to cling to the membranes of the gum and palate.

It is therefore, an object of this invention to provide an improved denture liner comprised of a new and novel chemical composition.

Another object of this invention is the provision of a permanent denture liner comprised of a chemical composition such that a hard liner is obtainable subsequent to a polymerization effected either by heat-curing or by chemical activation, and which hard liner, when formed to the denture base, affects an adhesion in the nature of a molecular clinging between itself and the mucous membranes of the mouth.

The denture liner of this invention comprises basically a polymer compound of fine acrylic polymer, such as polymethyl methacrylate mixed with U.S.P. plain talc. The best results have been obtained by the preferred embodiment comprising for every one pound of the compound, 6¾ ounces (42%) of the polymer and 9¼ (58%) ounces of the talc, although a range of from 6¾ to 8 ounces of polymer and of from 7 to 11 ounces of talc has resulted in satisfactory results.

As a plasticizer, a monomer of regular (liquid) methyl methacrylate is preferred by a ratio of one part by volume of the monomer to two and one-half parts by volume of the polymer compound. Specifically, the preferred embodiment comprises 9 cc. of the monomer and 22 cc. of the polymer compound. Here again, a range of from 8 to 11 cc. of the monomer and 20 to 24 cc. of the polymer compound has been successfully tested under actual conditions.

In use of the clinging liner of this invention, after trial packing a denture using a separating sheet such as cellophane, the liner is then trial packed. The liner to be packed is prepared by first proportioning, for example 22 cc. of the thoroughly mixed polymer compound with 9 cc. of regular acrylic monomer (liquid). After mixing the polymer compound powder and the monomer liquid to a homogeneous mass and then waiting from six to ten minutes, the mass is placed between two glass plates, using cellophane for separating. The mass is pressed as thin as possible and checked for voids or air bubbles. It is then ready to be trial packed with the denture in the usual manner, such as by the use of the flask method.

Should the lining material be used with old dentures, it is recommended that a new base of uncured acrylic be added to the tissue surface for proper adherence of the liner to the old dentures. After adding the lining material, the denture base and liner should be regularly processed at 169° F. for one and one-half hours, then raised to 212° F. for one hour using cellophane for the model when curing.

Although not preferred, the aforementioned polymer compound may be polymerized by the "fast" or "short" cure method wherein a small amount of tertiary amine such as dimethyl-p-toluidine has been added to the monomer as a chemical activator.

The theory underlying the invention is that the proper proportioning of the fine acrylic polymer and the plain talc results in the acrylic pearls formed during the polymerization of the monomer becoming embedded with the talc to such an extent that each pearl and particle of talc form a single solid molecule.

After the curing process, these molecular solids form in the liner a means by which adhesion between the talc, known for its skin clinging nature, and the mouth tissues combines with a capillary attraction between the liner and the saliva or mucous of the mouth tissues to maintain the hard liner in a clinging relation with the tissues against which the liner is pressed.

While the foregoing describes one preferred embodiment of the invention, equivalent ingredients may be used, and such should be remembered in defining the invention by the appended claims.

I claim:
1. A dental material for use in making denture liners comprising a composition of about 42% by weight of finely divided solid methyl methacrylate polymer, and about 58% by weight of U.S.P. plain talc, plasticized by a methyl methacrylate monomer.

2. A dental material for use in making denture liners comprised of from 6¾ to 8 ounces of finely divided solid methyl methacrylate polymer to 7 to 11 ounces of U.S.P. plain talc, plasticized by a methyl methacrylate monomer.

3. A hard clinging liner for a mouth denture comprising a composition of about 42% by weight of methyl methacrylate resin and about 58% by weight of U.S.P. plain talc plasticized by a methyl methacrylate monomer in substantially the ratio of one part by volume of the plasticizer and two and one-half parts by volume of the composition to obtain a jelly-like consistency, such liner hardening under the influence of heat into an integral structure with the denture, whereby when introduced into the mouth of the talc of the liner acts as an adhesive agent between the liner and the mouth tissue.

References Cited in the file of this patent
UNITED STATES PATENTS

| | | |
|---|---|---|
| 2,057,456 | Stringfield | Oct. 13, 1936 |
| 2,162,204 | Weith | June 13, 1939 |
| 2,420,570 | Shapiro | May 13, 1947 |
| 2,558,139 | Knock | June 26, 1951 |
| 2,947,716 | Cornell et al. | Aug. 2, 1960 |

FOREIGN PATENTS

| | | |
|---|---|---|
| 379,716 | Great Britain | Aug. 29, 1932 |
| 710,534 | Great Britain | June 16, 1954 |
| 552,273 | Canada | Jan. 28, 1958 |

UNITED STATES PATENT OFFICE
CERTIFICATE OF CORRECTION

Patent No. 3,073,795

January 15, 1963

Joseph E. Veverka

It is hereby certified that error appears in the above numbered patent requiring correction and that the said Letters Patent should read as corrected below.

Column 2, line 53, for "the mouth of the talc" read -- the mouth the talc --.

Signed and sealed this 23rd day of July 1963.

(SEAL)
Attest:

ERNEST W. SWIDER
Attesting Officer

DAVID L. LADD
Commissioner of Patents